H. L. ZABRISKIE AND F. DIEHL.
LUBRICATING RING.
APPLICATION FILED FEB. 10, 1919.
1,379,505.
Patented May 24, 1921.
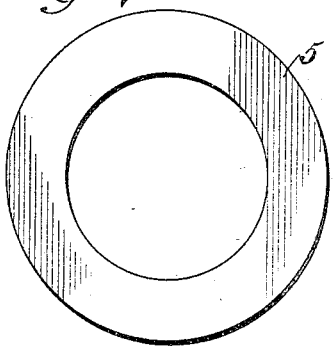
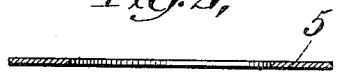
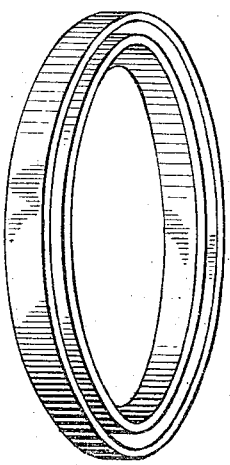
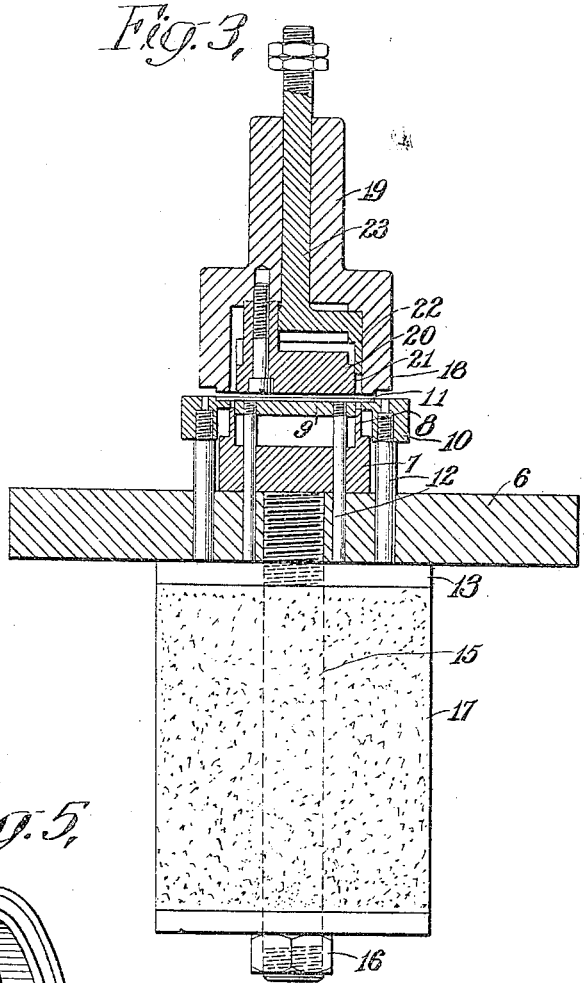
INVENTORS
Henry L. Zabriskie and Frederick Diehl
BY
Edwin B. H. Tower Jr.
ATTORNEY

UNITED STATES PATENT OFFICE.

HENRY L. ZABRISKIE, OF WESTFIELD, AND FREDERICK DIEHL, OF ELIZABETH, NEW JERSEY, ASSIGNORS TO DIEHL MANUFACTURING CO., OF ELIZABETH, NEW JERSEY, A CORPORATION OF NEW JERSEY.

LUBRICATING-RING.

1,379,505.      Specification of Letters Patent.      Patented May 24, 1921.

Application filed February 10, 1919. Serial No. 276,019.

*To all whom it may concern:*

Be it known that we, HENRY L. ZABRISKIE and FREDERICK DIEHL, citizens of the United States, residing, respectively, at Westfield, county of Union, State of New Jersey, and at Elizabeth, county of Union, State of New Jersey, have invented new and useful Improvements in Lubricating-Rings, of which the following is a specification.

This invention relates to lubricating rings for machinery shafts.

Lubricating rings are now generally made in various ways.

One way of making such rings is to turn the same on a lathe from solid or hollow bars. This method is objectionable because it is slow and expensive.

Two other methods commonly used are to bend strips of metal into a ring and weld the ends together or to turn a spiral from a hollow bar, cut apart the separate turns of the spiral and overlap or abut the ends and weld them together. These methods, while cheaper than the first, produce imperfect rings. The rings are usually rough or irregular at the weld and have a tendency to catch on a smooth shaft and stop rotating so that oil is not brought up to the shaft from the bearing reservoir in proper quantities. Rings made from the spirals are also objectionable in that they are not perfectly round.

Rings are also made by the die-casting process, but this process usually necessitates the use of metals which have little, if any, shrinkage and low melting temperatures. Rings made in this manner lack strength and elasticity.

One of the objects of this invention is to provide a lubricating ring which has none of the above disadvantages of the rings now commonly used.

Another object is to provide a ring which will convey large quantities of oil to the shaft.

Another object is to provide a lubricating ring which is both light and rigid.

Another object is to provide a ring which is free from irregularities.

Another object is to provide a simple and inexpensive process for making lubricating rings.

Other objects and advantages will appear from the following specification and claims.

In the drawings,

Figure 1 is a plan of a disk of metal formed by the first step in the improved process;

Fig. 2 is a cross-section thereof;

Fig. 3 is a cross-section of a drawing punch and die such as may be used in the second step of the preferred process;

Fig. 4 is a cross-section of a finished ring; and

Fig. 5 is a perspective thereof.

In accordance with its preferred embodiment, the lubricating ring comprehends a continuous circular ring of sheet metal of substantially U-shaped cross-section and the process comprehends stamping a flat ring from a sheet of metal and drawing the ring thus formed into a continuous substantially U-shaped channel.

The process as preferably practised consists in first stamping a thin flat ring or disk 5 of the desired size from a sheet of mild steel. Disks of smaller size may be stamped from the center punchings so that waste is reduced.

The flat ring or disk 5 is then placed in a punch or drawing press, where it is drawn to the desired channeled shape. The press which it has been found convenient to use has a stationary bed-plate 6 upon which rests an anvil or punch block 7. Anvil 7 has a circular upstanding ring 8 which shapes the inside of the channel of the finished lubricating ring. Located within ring 8 is a movable inner stripper 9 and outside of ring 8 is a movable outer stripper 10. The outer stripper 10 is provided with a circular seat or centering guide 11, whose diameter is approximately the outside diameter of disk 5. This guide facilitates the rapid and proper positioning of the disks in the press. The inner and outer strippers are each provided with a number of pins 12, which extend downwardly through openings in the bed-plate 6 and rest on a metal plate 13. A second metal plate 14 is held in proper position relative to the bed-plate by a screw 15 and nut 16. Between plates 13 and 14 is a suitable spring, such as a rubber pad 17. Normally the spring 17 presses the inner and outer strippers 9 and 10 upward, so that their upper surfaces are above the top of forming ring 8, as shown.

The die of the press comprises an outer circular forming member 18 having a shank 19 which fits into the ordinary socket of the movable member of the press. Within the outer member and secured thereto is a circular inner forming member 20. The outer diameter of member 20 and the inner diameter of member 18 are so related as to provide a continuous circular channel 21, which coöperates with ring 8 to draw the metal disk into the desired channeled shape. Fitting within channel 21 is a knockout member 22, which is provided with a suitable pin 23, and which forces the finished lubricating ring out of the channel.

In operation, disk 5 is placed within the guide of stripper 10 and the press members are brought together. The inner and outer forming members 18 and 20, respectively, force the stripper members 9 and 10 downward against the tension of spring 17, and the inner and outer edges of the disk are bent downward and the disk is drawn about ring 8. When the lubricating ring has been sufficiently drawn to the desired size and shape, the movable member of the press returns. The strippers 9 and 10 are forced back to normal position by spring 17, and, when the press members are sufficiently separated, pin 23 engages some suitable relatively stationary part of the press and the knockout member 22 is momentarily forced downward. Thus the strippers 9 and 10 prevent the finished lubricating ring from sticking about ring 8, and the knockout member 22 prevents the ring from sticking in the channel 21.

In this way the disk 5 is drawn into a lubricating ring of substantially U-shaped cross-section, as shown in Figs. 4 and 5, and may be readily removed from the press.

The details of the press are not shown, since any of the well-known types may be used. The drawing members shown may also be modified in various ways.

Other methods of producing the lubricating ring may be employed. For example, the projection and groove of the punch and die may be reversed so that, instead of drawing down the outer and inner edges of the disk, the center thereof is depressed. The ring may also be produced by the spinning process, in which a flat metal disk is rotated at fairly high speed and the operator, using a polished steel tool, forms the disk into the desired channeled shape.

The lubricating ring thus formed is a continuous substantially U-shaped channel, the axis of the channel being substantially parallel to the axis of the ring. Such a ring provides better lubrication for the shaft, because, being made in one piece, it has no irregularities due to welding or brazing and consequently will not catch on the shaft and cease to rotate. Furthermore, since one side of the channel is open, an unobstructed path is afforded for the flow of oil from the pocket along the shaft. The channeled shape presents a large surface to the oil as compared to the outside dimensions of the ring, and, in addition, the capillary attraction of the inner walls of the groove assists in carrying up a large quantity of oil as the ring revolves. The comparatively large surface presented to the oil in the bearing reservoir also provides a breaking action, especially with high speed shafts, so that there is less tendency to throw the oil against the upper cover of the bearing housing with the resulting danger of leakage. By making the ring of sheet metal, a considerable saving in the cost of material is effected and a strong and elastic metal may be employed. By the simple processes of punching and drawing, the time and expense of the labor required is reduced to a minimum.

The invention claimed is:

1. A lubricating ring comprising a continuous circular substantially U-shaped metal channel, open at one side.

2. A lubricating ring comprising a continuous circular substantially U-shaped metal channel the axis of the channel being parallel to the axis of the ring.

3. A lubricating ring comprising a continuous circular substantially U-shaped metal channel open at one side to facilitate the flow of oil to the shaft, the U-shaped channel extending parallel with the axis of the ring and being formed from a continuous ring of stamped sheet metal.

4. A lubricating ring for a shaft comprising a continuous metal channel open at one side and formed from an annular sheet metal stamping, whereby an unobstructed path is afforded for the flow of oil along the shaft from the ring.

5. A lubricating ring comprising a continuous annular sheet metal stamping having a continuous annular pocket open at one side for carrying the lubricant.

6. A lubricating ring for a shaft comprising a continuous circular sheet metal stamping drawn to form a continuous annular oil receiving pocket, the pocket being open at one side to afford an unobstructed path for the flow of oil to the shaft.

7. A lubricating ring comprising a continuous circular substantially U-shaped channel formed from a continuous flat ring whereby a continuous annular oil receiving groove having one side open, is provided.

In witness whereof, we have hereunto subscribed our names.

HENRY L. ZABRISKIE.
FREDERICK DIEHL.